United States Patent [19]
Wickson

[11] 3,868,552
[45] Feb. 25, 1975

[54] ELECTRICAL CIRCUIT AND INTERRUPTER

[75] Inventor: Arthur K. Wickson, Palos Verdes Estates, Calif.

[73] Assignee: The Garrett Corporation, Los Angeles, Calif.

[22] Filed: Nov. 5, 1973

[21] Appl. No.: 413,116

[52] U.S. Cl................ 317/40 A, 102/70.2, 317/80, 337/4
[51] Int. Cl. ............................................. H02h 5/04
[58] Field of Search...... 337/4, 5, 22; 317/80, 40 A; 102/70.2

[56] References Cited
UNITED STATES PATENTS

| | | | |
|---|---|---|---|
| 3,045,148 | 7/1962 | McNulty et al.................... | 102/70.2 |
| 3,728,583 | 4/1973 | Wickson........................... | 317/40 A |

Primary Examiner—James D. Trammell
Attorney, Agent, or Firm—Ben E. Lofstedt; Albert J. Miller

[57] ABSTRACT

One or more fuses are connected in series with an electrical power line and coupled to a current-multiplying circuit. The current-multiplying circuit, in turn, is coupled to an energy storage and switching circuit. The switching circuit is triggered by a signal from a sensing circuit coupled to the power line when an electrical disturbance is present on the electrical power line, thereby delivering the energy to the current-multiplying circuit causing the fuse or fuses to open within a substantially shorter time than the line fuse and in response to electrical disturbances which would not normally cause the fuse to blow and without producing an unacceptable electrical disturbance itself during the process.

14 Claims, 2 Drawing Figures

ELECTRICAL CIRCUIT AND INTERRUPTER

BACKGROUND OF THE INVENTION

In many types of electrical systems it is desired to open a circuit or interrupt a current very quickly. The increasing use of computers has resulted in a demand for improved protection and stability of the "critical bus" that feeds the various components of the computer system. In many applications of computers the voltage of the critical bus must be maintained within close tolerances for both steady state and transient disturbances. For example, a transient change of voltage of ± 20% for only 1 millisec may be sufficient to either shut down the computer or to cause errors in the processed data. Consequently, the critical bus is commonly supplied with power from "Uninterruptible Power Systems." For instance, these Uninterruptible Power Systems employ several sources of power which operate in parallel to supply a critical bus. Should one of the paralleled sources of power develop as internal fault, it must be disconnected from the critical bus as rapidly as possible to minimize the resulting disturbance to the voltage of the critical bus produced by this internal fault.

A common approach for this purpose is the use of a solid state semiconductor switch between each power source and the critical bus. These switches operate to open a circuit in approximately 0.2 millisecs. However, such semiconductor switches are costly and commonly add a disturbance to the line during the process of opening the circuit.

Another approach is to employ an electrical fuse having a notch or reduced-section portion, adjacent which is a source of mechanical energy which is arranged to be energized from a charge on a capacitor by the closure of a switch, such as described in my U.S. Pat. No. 3,728,583, issued Apr. 17, 1973. However, the aforementioned patent does not utilize electrical energy to directly produce melting, vaporization and subsequent separation of the fuse. Instead, such separation is accomplished indirectly via the use of independent separative force means, such as heat produced by heating of a resistance wire or by an electromagnetic repulsion coil. Since additional separative force means is required, such an arrangement is relatively costly. Therefore a less expensive means of precisely and rapidly producing a physical disconnection of a faulted circuit from the critical bus would have immediate and increasing applications.

Normal fusing of a circuit is not suitable for protecting the critical bus against voltage disturbances because it opens the circuit too slowly and passes too much current to the fault. Typically, a 100 ampere fuse opens a circuit in about 20 milliseconds with a current of about 600 amperes, or in about 2 milliseconds with a current of about 1,200 amperes. During the period of fuse clearing, the voltage on the critical bus will drop much more than 20%.

The slow action of the fuse is caused by the time required to melt and vaporize the fuse conductor or link, plus the time required to extinguish the arc. The period of arc extinction is purposely extended to about the same time as the period of conductor melting in order to limit the peak voltage across the fuse (and feeder circuit). In other words, it is usually desired that the rate of current decay be equal to the rate of current increase. The current required to melt and vaporize the conductor is very high because the resistance of the fuse conductor must be low.

The present invention provides a circuit interrupter which has a much shorter period to open a circuit and much lower values of current passed through the circuit by applying some or all of the following principles:

1. The energy required to open the fuse is drawn from an isolated source instead of from the critical bus.
2. The instant of energy release is precisely controlled relative to the instantaneous value of current in the circuit.
3. The rate of energy application to the physical action of opening the circuit is increased.

It is an object to provide a fuse arrangement having improved characteristics with respect to high speed opening of an electrical circuit upon the occurrence of a specific value of current. In that regard it is obvious that the interrupter could also be made to open the circuit upon the occasion of a predetermined rate of change of current, if such were desired.

Another object of the present invention is to provide a means for interrupting the current flow in a current-carrying circuit without introducing unacceptable voltage or current disturbances in the critical bus to which the current-carrying circuit is connected.

It is a general object to provide a fuse or circuit interrupter apparatus having a plurality of expendable or rupturable links fixedly supported by terminals arranged for connection in a line conductor, rupturing means operatively coupled to the link to effect a fracture or rupture thereof by the application of electrical energy which is derived from a standby source of stored electrical energy upon the occurrence of a predetermined magnitude or rate of change of current.

SUMMARY OF THE INVENTION

One or more fuses are connected in series with the electrical conductor which connects the power supply to the critical bus thereby creating a fused section. A current-increasing transformer having a secondary winding impedance — matched to the fused section wherein one lead of the secondary winding is operatively connected to the fused section and the other lead of the secondary winding is operatively connected to diode means to prevent the main circuit current from flowing through the transformer after the fuse or fuses are ruptured. A switch and a capacitor are connected in series with the primary winding of the transformer. Means are provided for charging the capacitor and for detecting unacceptable variations of voltage or current in the power supply. When unacceptable electrical disturbances occur in the main electrical circuit, the switch is triggered allowing the capacitor to discharge into the transformer which, in turn, multiplies the current to the fuses to force them to blow open within a substantially smaller time period than is normal.

It is a specific object to provide a fuse as aforesaid having means for sensing the current in the link, and circuit means connected with the sensing means and the rupturing means whereby the rupturing force means is energized upon the advent of predetermined signal information provided to the circuit means by the current sensing means.

It is a further object to provide a fuse as aforesaid in which the rupturing means comprises an electrical fuse, which is connected to a source of electrical energy discharge such as a capacitor and switch device in the circuit means, with the switch being arranged to couple the energy source, i.e. the capacitor to the fuse by the action of the sensing means.

DESCRIPTION OF THE PREFERRED EMBODIMENT

Figure 1:
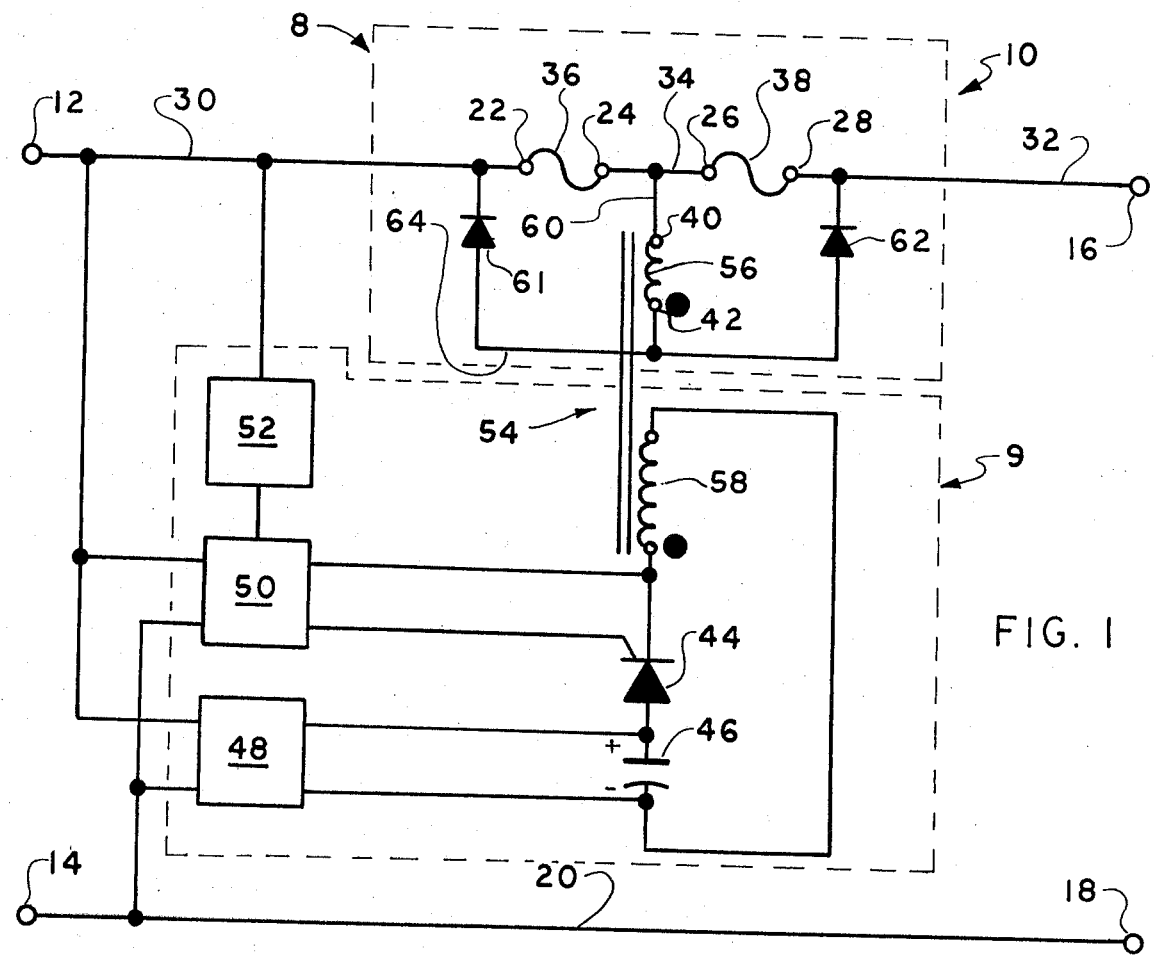
FIG. 1 is a schematic illustration of a preferred embodiment of the invention.

Referring to FIG. 1 there is shown a fuse system 10 arranged for connecting to the terminals 12 and 14 of a power source (not shown) of alternating current which is to supply a load (not shown) connected to terminals 16 and 18 of the system 10. The conductor 20 connects the terminals 14 and 18. The system 10 comprises a fuse section 8 and a fuse melting circuit 9. The fuse system 8 comprises a plurality of fuse terminals, in varied combination: 22, 24 and 26, 28, respectively, and disposed in spaced apart relation. Conductors 30 and 32 connect the respective terminals 12 and 22 and the terminals 16 and 28. Conductor 34 connects the terminals 24 and 26.

Rupturable conductors or fuses 36, 38 are affixed to and coupled between the terminals 22, 24 and 26, 28 respectively.

The fuse melting circuit 9 comprises an impedance-matching transformer, generally indicated at 54, a high-speed switch such as a thyristor 44, a discharge capacitor 46 and their associated electrical disturbance sensing circuit 52, switch-triggering circuit 50 and the capacitor charging means 48.

The secondary winding 56 of an impedance-matching transformer, generally indicated at 54, is connected at its negatively-polarized terminal 40, via conductor 60, to conductor 34, which interconnects, in series arrangement, the fuses 36 and 38. The positively-polarized terminal 42 is connected to the anodes of diodes 61 and 62 which are connected anode-to-anode in typical back-to-back fashion.

The primary 58 of the transformer 54 is connected in series with the series-connected combination of thyristor 44 and the discharge capacitor 46.

A capacitor charging means 48 is provided and coupled to the capacitor 46 for applying a charge thereto. As shown in FIG. 1 the charging means 48 is connected to the conductors 20 and 30 as a source of power to charge the capacitor 46, but it will be appreciated that the charging means 48 may obtain its power from any convenient source.

The thyristor 44 is arranged for triggering by a triggering means 50 coupled to the gate and cathode electrodes of the thyristor. Conveniently, the triggering means may be coupled to the conductors 20 and 30 as a source of power. Both the charging and triggering means 48 and 50 are circuit arrangements well known to those skilled in the art and need not be disclosed in detail.

There is provided a sensing means 52 coupled with the conductor 30 to continuously sense the current in that conductor, hence to provide a measure of the current drawn by the load from the terminals 16 and 18. It is obvious, of course, that the means 52 could be coupled to the conductor 20 instead of the conductor 30, if so desired. The means 52 may be any one of several known devices. For example, the conductor 28 could have a shunt similar to that employed with ammeters, in which case the signal supplied to the triggering means 50 would be a voltage commensurate with the current in the shunt. If it is necessary or desired to have an uninterrupted conductor 30 between the terminals 12 and 24, the sensing means 52 could have the form of a turn of wire or a coil of a number of wire turns around the conductor 30 and subjected to the electromagnetic field thereof. In the latter case the sensing means 52 would probably comprise also a network of logic to account for the changes of current occurring in the conductor 30 and fed to the logic by the coil about the conductor, with an appropriate signal then being fed to the triggering means 50, all as well known to those skilled in the art. It should be noted also that the combination of the sensing means 52 and the triggering means 50 provide the circuit 10 with the capability of causing the fuses 36, 38 to open when an electrical disturbance is present on the conductor 30 which is of insufficient magnitude to blow the fuses 36, 38.

The circuit 10 operates as follows, assuming that the system 10 has its terminals 12, 14 and 16, 18 coupled to an appropriate alternating current power source and load, respectively, and that the capacitor 46 is fully charged from the charging circuit 48. When a short circuit or any form of additional low impedance fault occurs across load terminals 16 and 18, the current through the fuses 36, 38 increases. When the value of this current reaches a preset level, as determined by the sensing means 52, the trigger voltage supplied by the means 50 to the thyristor 44 causes the latter to switch into conduction to discharge the capacitor 46 through the primary 58 of the impedance-matching transformer 54. The transformer 54 effectively matches the impedance of the fuse melting circuit 9 to the fuse circuit 8. Since the impedance of the fuse circuit 8 is relatively low with respect to the impedance of the fuse melting circuit 9, the effect of the transformer's action is to increase the value of the current flowing in the secondary winding 56 and through the fuses 36, 38 from that current which is flowing in the primary 58. In addition, the leakage inductive effect of the primary 58 in the functioning of the circuit 10 is to improve the efficiency and extend the duration of the energy transfer from the capacitor 46 to fuse circuit 8.

Since the impedances of the two circuits 8 and 9 are matched via the impedance-matching transformer 54, maximum power transfer will occur between these two circuits, thus optimizing the ratings and costs of the components in circuits 8 and 9.

The energy from the capacitor 46 is transferred via the transformer 54 and the diodes 61, 62 to the fuses 36, 38. Diodes 61, 62 serve to isolate the conductors 30 and 32 after the two fuses 36 and 38 are ruptured. Without diodes 61, 62, conductors 63 and 64 would merely serve as another current path in parallel with fuses 36, 38, thereby nullifying the purpose for which the fuses 36, 38 were installed, that is, to protect the equipment from electrical faults such as overloads.

Since the impedances of the fuses 36, 38 are rarely identical, one fuse will blow open before the other fuse. In the event that only a single fuse were installed in the power line between terminals 12, 16, after the fuse ruptured, the alternating current in the power line flowing between terminals 12, 16 would now be flowing as a pulsating direct current through the secondary winding 56 of the transformer 54. As a result, the power line would not be disconnected, as intended, and the undesirable effects of electrical faults and disturbances on the power line would remain on the power line between terminals 12, 16.

Consequently, in order to utilize the highly-desirable characteristics of a transformer, such as 54, a second fuse must be connected in series with the first fuse, the junction of these fuses 36, 38 being connected to one terminal 40 of the secondary winding 56. When both fuses 36, 38 are blown, the secondary winding 56 is electrically disconnected from the power line between terminals 12, 16.

The only electrical connection between terminals 12, 16, thereafterwards remaining is the current path through diodes 60, 62. However, because these diodes are connected in back-to-back relationship, no current can flow therethrough. Consequently, the power line connection between terminals 12, 16 is such as to prevent any electrical current from flowing therethrough.

Figure 2:
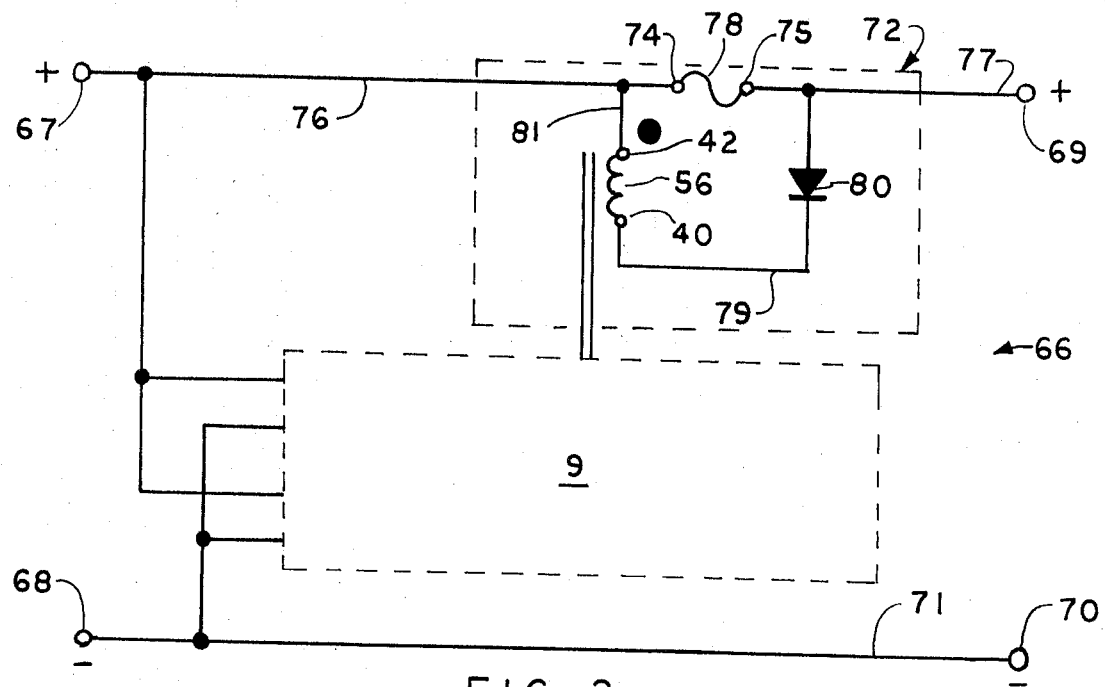
FIG. 2 is a schematic illustration of another preferred embodiment of the present invention.

Referring now to FIG. 2, there is shown a fuse system 66 arranged for connecting terminal 67 to a positive source of direct current and 68 to a negative source of direct current (not shown) which is to supply a load (not shown) connected to terminals 69 and 70 of the system 66. The conductor 71 connects the terminals 68 and 70. The system 66 comprises a fuse section 72 and a fuse melting circuit 9 which is identical to that used in the alternating current fuse system 10 of FIG. 1.

The fuse system 66 comprises a plurality of fuse terminals 74 and 75. Conductors 76 and 77 connect the repective terminals 67 and 74 and terminals 69 and 75.

A fuse 78 is affixed to and coupled between the terminals 74 and 75.

However, in the direct current fuse system 66 of FIG. 2, the secondary winding 56 of the transformer 54, is connected at its negatively-polarized terminal 40, via conductor 79, to the cathode of diode 80. The positively-polarized terminal 42 is connected to the junction of conductor 76 and the fuse terminal 74 via conductor 81. The anode of the diode 80 is connected to the junction of fuse terminal 75 and conductor 77.

Assuming that the system 66 has its terminals 67, 68 and 69, 70 coupled to an appropriate direct current power source and load, respectively, and that the capacitor 46 is fully charged from the charging circuit 48, the system 66 of FIG. 2 operates similar to the system 10 of FIG. 1 with the following differences:

When the secondary winding 56 is energized by the fuse melting circuit 9, the current flowing through the fuse 78 rapidly increases until it ruptures as previously described.

Diode 80 serves to prevent the flow of direct current from terminal 67, via conductors 76, 77 to terminal 69. If this were to occur, the rupturing of the fuse would not open the circuit for current flow from the power source to the load circuit.

What I claim is:

1. An electrical circuit interrupter for a current-carrying circuit between a power source and a load circuit comprising:
   a. fuse means connected in series with said current-carrying circuit;
   b. current-amplifying means having input and output connections, one of said output connections being operatively coupled to one end of said fuse means;
   c. means operatively connected between the other of said output connections and said other end of said fuse means to prevent the flow of current from the power source to the load circuit after the fuse has ruptured;
   d. means for sensing electrical disturbances in said current-carrying circuit to provide signal information; and,
   e. means operatively coupled to said input connections for providing electrical current to said current amplifying means in response to said signal information whereby said fuse means is ruptured to interrupt the flow of current in said current-carrying circuit.

2. The electrical circuit interrupter of claim 1 in which said fuse means is a rupturable link fixedly supported at spaced-apart terminals for connection in said current-carrying circuit.

3. The electrical circuit interrupter of claim 1 in which said current-amplifying means is a transformer.

4. The electrical circuit interrupter of claim 3 in which said transformer matches the impedance of the circuits coupled to said primary winding to the impedance of the circuits coupled to said secondary winding.

5. The electrical circuit interrupter of claim 1 in which said signal information provided by said sensing means varies with the magnitude of the current in said current-carrying circuit, said means for providing electrical current being energized upon the advent of a predetermined magnitude of current in said current-carrying circuit.

6. An electrical circuit interrupter for a current-carrying circuit comprising:
   a. a pair of series-connected fuses connected in series with said current-carrying circuit;
   b. a pair of back-to-back, series-connected diodes connected in parallel with said pair of fuses;
   c. a transformer having one end of its secondary winding connected to the junction of said pair of fuses and the other end connected to the junction of said diode pair;
   d. current-sensing means for sensing the current in said current-carrying circuit to provide signal information.
   e. electrical energy storage means;
   f. means for charging said energy storage means;
   g. switch means operatively connected to the primary winding of said transformer and said energy storage means; and
   h. switch control means operatively coupled to said current-sensing means and said switch means for triggering said switch on in response to said signal information whereby said energy in said storage means is delivered to said fuses via said transformer and said diodes to activate said fuses to thereby interrupt the flow of current in said current-carrying circuit.

7. The electrical circuit interrupter of claim 6 in which said fuses are rupturable links fixedly supported at spaced-apart terminals for connection in said current-carrying circuit.

8. The electrical circuit interrupter of claim 6 in which said diodes are connected anode-to-anode.

9. The electrical circuit interrupter of claim 6 in which said transformer is an impedance-matching transformer wherein the impedance of the circuits coupled to said primary winding are matched to the impedance of the circuits coupled to said secondary winding of said transformer.

10. The electrical circuit interrupter of claim 6 in which said transformer is a current step-up transformer.

11. The electrical circuit interrupter of claim 6 in which the signal information provided by said sensing means varies with the magnitude of the current in said current-carrying circuit, said switch means being energized upon the advent of a predetermined magnitude of current in said current-carrying circuits.

12. The electrical circuit interrupter of claim 6 in which said electrical energy storage means is a capacitor.

13. The electrical circuit interrupter of claim 6 in which said switch means is a thyristor.

14. The method of interrupting the flow of electrical current from a power source to a load in a current-carrying circuit comprising the steps of:

a. Providing fuse means in series with said current-carrying circuit;
b. Charging an electrical energy storage means;
c. Sensing an electrical disturbance in a current-carrying circuit to provide signal information;
d. Discharging said energy storage means in response to said signal information into a current-increasing means to provide increased current;
e. Delivering said increased current from said current-increasing means through said fuse means in the direction of current flow in said current-carrying circuit to rapidly activate said fuse means to interrupt the flow of current in said current-carrying circuit; and,
f. Blocking the flow of current from the power source to the load through said current increasing means.

* * * * *